(12) United States Patent
Tsuchiya

(10) Patent No.: US 11,591,034 B2
(45) Date of Patent: Feb. 28, 2023

(54) DRIVING DEVICE, LIGHTING DEVICE, AND VEHICLE

(71) Applicant: HONDA MOTOR CO., LTD., Tokyo (JP)

(72) Inventor: Yosuke Tsuchiya, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 46 days.

(21) Appl. No.: 17/398,066

(22) Filed: Aug. 10, 2021

(65) Prior Publication Data

US 2022/0063745 A1 Mar. 3, 2022

(30) Foreign Application Priority Data

Aug. 27, 2020 (JP) .............................. JP2020-143817

(51) Int. Cl.
| | |
|---|---|
| *B62J 6/022* | (2020.01) |
| *H05B 47/11* | (2020.01) |
| *H05B 47/155* | (2020.01) |
| *B62J 6/16* | (2020.01) |
| *B62J 6/04* | (2020.01) |
| *B62J 6/26* | (2020.01) |
| *B62J 6/056* | (2020.01) |

(52) U.S. Cl.
CPC .............. *B62J 6/022* (2020.02); *H05B 47/11* (2020.01); *H05B 47/155* (2020.01); *B62J 6/04* (2013.01); *B62J 6/056* (2020.02); *B62J 6/16* (2013.01); *B62J 6/26* (2020.02)

(58) Field of Classification Search
CPC ...... H05B 47/11; H05B 47/155; H05B 45/12; H05B 45/22; B62J 6/022; B62J 6/04; B62J 6/056; B62J 6/16; B62J 6/26; B62J 6/055; Y02B 20/40
See application file for complete search history.

(56) References Cited

U.S. PATENT DOCUMENTS

| | | | |
|---|---|---|---|
| 9,474,128 B2 | 10/2016 | Hoang | |
| 9,867,258 B2 | 1/2018 | Hoang | |
| 2016/0050736 A1 | 2/2016 | Hoang | |
| 2017/0006690 A1 | 1/2017 | Hoang | |
| 2022/0063745 A1* | 3/2022 | Tsuchiya | ................ B62J 45/41 |

FOREIGN PATENT DOCUMENTS

| | | |
|---|---|---|
| JP | 2017-524243 A | 8/2017 |
| JP | 2017-183287 A | 10/2017 |
| JP | 2019-064370 A | 4/2019 |

OTHER PUBLICATIONS

Japanese Office Action for Japanese Patent Application No. 2020-143817 dated May 13, 2022 (partially translated).

* cited by examiner

*Primary Examiner* — Alexander H Taningco
*Assistant Examiner* — Pedro C Fernandez
(74) *Attorney, Agent, or Firm* — Thomas | Horstemeyer, LLP

(57) ABSTRACT

A driving device for driving an in-vehicle lighting device in which a plurality of light sources are arranged in one direction, comprising a detection unit configured to detect an environment of a vehicle, and a driving unit configured to drive the plurality of light sources in sequence in the one direction, wherein the driving unit drives the plurality of light sources so that driving timings of the plurality of light sources will change in accordance with a detection value obtained by the detection unit.

9 Claims, 5 Drawing Sheets

DRIVING DEVICE, LIGHTING DEVICE, AND VEHICLE

CROSS-REFERENCE TO RELATED APPLICATION(S)

This application claims priority to and the benefit of Japanese Patent Application No. 2020-143817, filed on Aug. 27, 2020, the entire disclosure of which is incorporated herein by reference.

BACKGROUND OF THE INVENTION

Field of the Invention present invention mainly relates to a lighting device.

Description of the Related Art

Among in-vehicle lighting devices, there is a device that turns on a plurality of light sources in sequence to indicate an intention of a driver to a third party. A direction indicator (a turn signal) is such an example (see Japanese Patent Laid-Open No. 2017-183287 and Japanese Patent Laid-Open No. 2019-64370), and this kind of a direction indicator can also be referred to as a sequential blinker or the like.

In general, a person can observe a target object by adjusting his/her pupils in accordance with the environment. However, the driving mode of a conventional lighting device has room for improvement in this point of view.

SUMMARY OF THE INVENTION

An object of the present invention is to show an example in which a lighting device is used to indicate an intention of a driver to a third party more suitably.

One of the aspects of the present invention provides a driving device for driving an in-vehicle lighting device in which a plurality of light sources are arranged in one direction, comprising a detection unit configured to detect an environment of a vehicle, and a driving unit configured to drive the plurality of light sources in sequence in the one direction, wherein in a first case in which a detection value obtained by the detection unit is larger than a reference value, the driving unit will drive the plurality of light sources in sequence so that a time from a driving timing of a given light source to a driving timing of a subsequent light source will decrease in sequence, and in a second case in which the detection value is smaller than the reference value, the driving unit will drive the plurality of light sources in sequence so the time for the driving timing of the given light source to the driving timing of the subsequent light source will not decrease in sequence compared to the first case.

Further features of the present invention will become apparent from the following description of exemplary embodiments with reference to the attached drawings.

DESCRIPTION OF THE EMBODIMENTS

Figure 1:
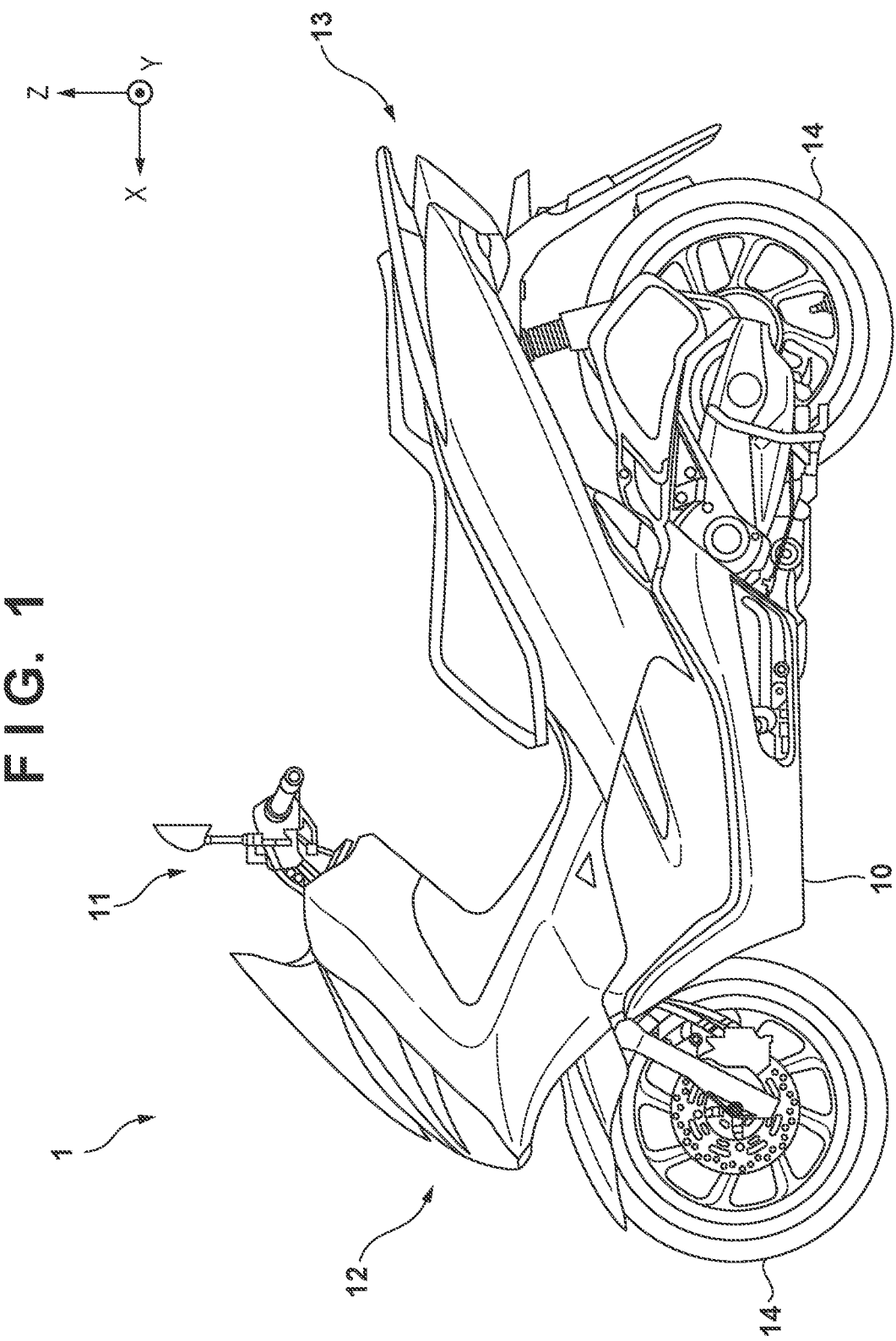
FIG. 1 is a schematic side view of a vehicle according to an embodiment.

Embodiments will be described in detail hereinafter with reference to the accompanying drawings. Note that the following embodiments are not intended to limit the scope of the appended claims, and not all of the combinations of features described in the embodiments are necessarily essential to the present invention. Two or more of a plurality of features described in the embodiments may be arbitrarily combined. In addition, the same reference numerals denote the same or similar components, and a repetitive description thereof will be omitted.

(Arrangement of Vehicle)

Figure 2:
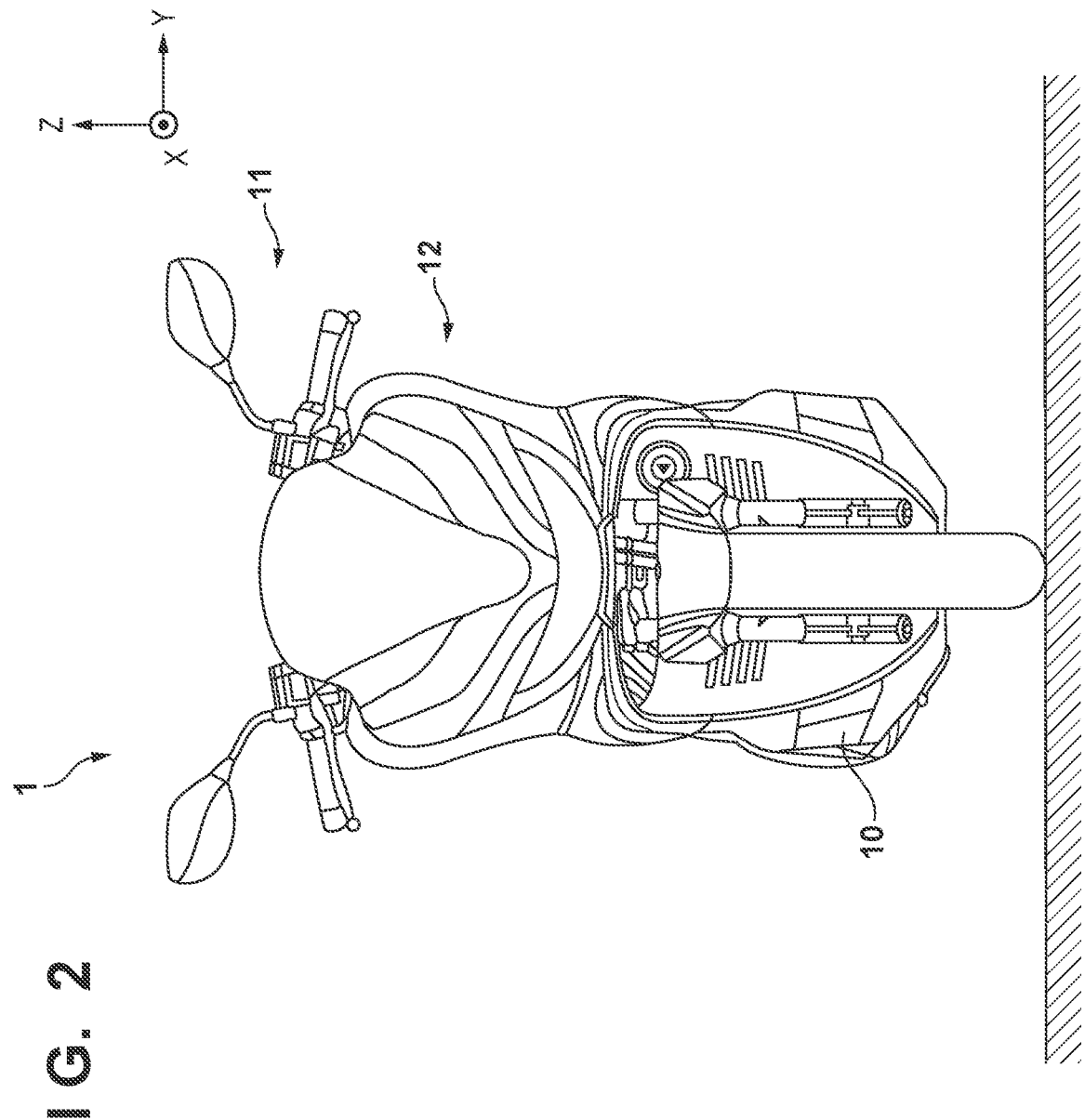
FIG. 2 is a schematic front view of the vehicle.
Figure 3:
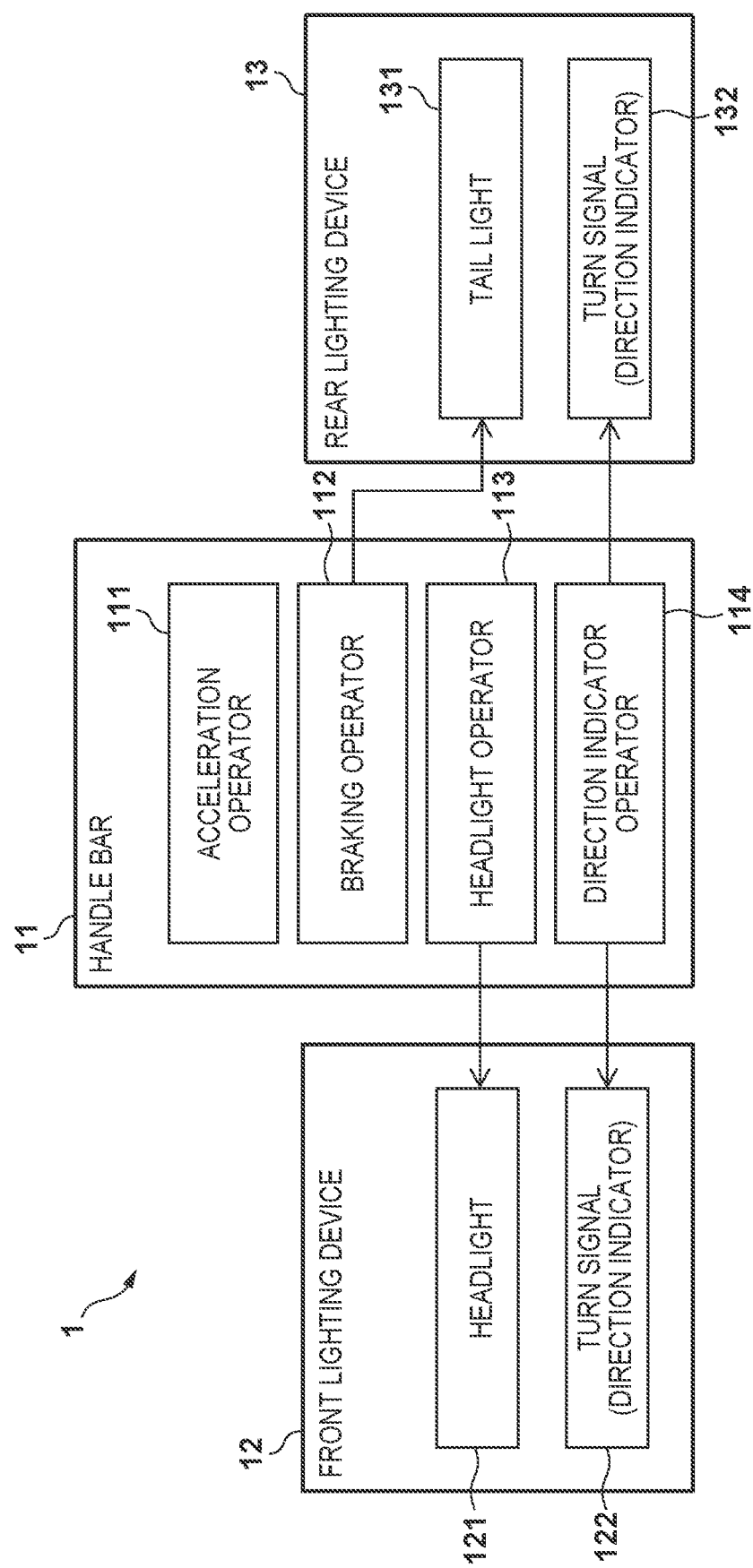
FIG. 3 is a block diagram showing the arrangement of a system of the vehicle.

FIG. 1 shows a side view of a vehicle 1 according to an embodiment. FIG. 2 shows a front view of the vehicle 1. FIG. 3 shows a part of the arrangement of a system of the vehicle 1. Note that in FIGS. 1 and 2, an X direction represents the longitudinal direction of the vehicle body, a Y direction represents the left-and-right direction of the vehicle body, and a Z direction represents the up-and-down direction of the vehicle body.

Although a saddle type vehicle is used as an example of the vehicle 1 according to this embodiment, another type of vehicle may be used. The saddle type vehicle indicates a vehicle of a type in which a driver will straddle the vehicle body to ride the vehicle. The concept includes not only a motorcycle (including a motorized bicycle and a scooter type vehicle) but also a three-wheeled vehicle (a vehicle with one front wheel and two rear wheels or with two front wheels and one rear wheel) and a four-wheeled vehicle.

The vehicle 1 includes a handle bar 11, a front lighting device 12, a rear lighting device 13, and wheels (a front wheel and a rear wheel in this case) 14. The handle bar 11 can pivot with respect to a vehicle body 10, and a rider who is the driver of the vehicle 1 can perform a steering operation (change the direction of the front wheel 14) by making the handle bar 11 pivot. An acceleration operator 111, a braking operator 112, a headlight operator 113, and a direction indicator operator 114 are provided on the handle bar 11. These operators are attached to positions where they can be easily operated by the rider.

The front lighting device 12 is provided to form the front portion of the vehicle body of the vehicle 1, and includes a headlight 121 and turn signals (direction indicators) 122. The turn signals 122 include a pair of left and right devices in the front portion of the vehicle body. The rear lighting device 13 is provided to form the rear portion of the vehicle body of the vehicle 1, and includes a tail light 131 and turn signals (direction indicators) 132. The turn signals 132 include a pair of left and right devices in the rear portion of the vehicle body. Any of these components 12, 121, 122, 13, 131, and 132 may be referred to as a lighting device, a lighting body, a lighting apparatus, or the like.

Here, the acceleration operator 111 is an accelerator grip provided at an end portion of the handle bar 11, and the rider can perform an acceleration operation by making the accelerator grip pivot.

Here, the braking operator 112 is a brake bar provided on the front side of the accelerator grip, and the rider can perform a braking operation by operating the brake bar. Note that another braking operator different from the braking operator 112 is provided on the lower side of the vehicle body, and the rider can also perform the braking operation by the other braking operator as well, although a detailed description thereof will be omitted here. If the braking operation is performed by the rider, the tail light 131 is turned on.

The headlight operator 113 is, for example, a switch type operator used to change the irradiation direction of the headlight 121, and enables switching of high beam/low beam.

The direction indicator operator 114 is, for example, a switch type operator used to perform a driving operation of the turn signals 122 and 132, and is used, when performing a route change such as a left turn, a right turn, or a lane change, to display such an intention to another person (a third party such as a pedestrian or the like) in the periphery of the self-vehicle. The driving modes of the turn signals 122 and 132 will be described in detail later.

(Arrangement of Lighting Device)

Figure 4:
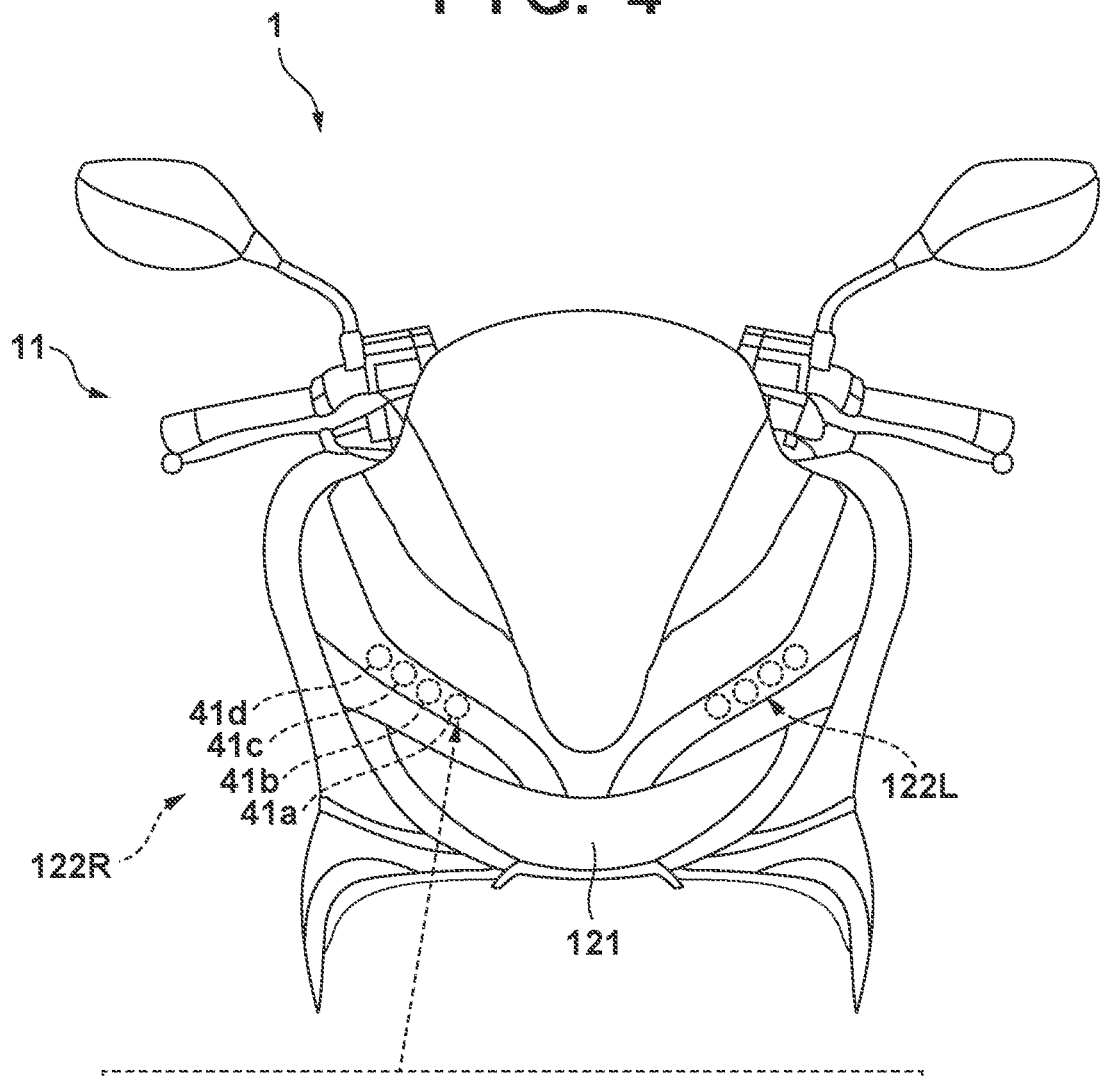
FIG. 4 is an enlarged schematic view of a portion of the vehicle.

FIG. 4 shows an enlarged view of a part of the front view of the vehicle 1. In FIG. 4, the pair of left and right turn signals 122 are discriminated and shown as a turn signal 122R and a turn signal 122L. The turn signal 122R includes a plurality (four in this case) of light sources 41a to 41d and a driving device 42 for driving these light sources. The turn signal 122L is also arranged in a similar manner. The plurality of light sources 41a, 41b, 41c, and 41d are arranged in sequence in a single direction. Assume here that the plurality of light sources 41a, 41b, 41c, and 41d are arranged at predetermined intervals (at substantially regular intervals in this case) from the inner side to the outer side in a vehicle width direction.

The driving device 42 includes a detection unit 421 and a driving unit 422. The detection unit 421 detects the environment of the vehicle. In this embodiment, assume that the detection unit 421 detects the brightness of the external environment of the vehicle 1 and is able to detect whether the self-vehicle is in a daytime environment or a nighttime environment. A known illuminance sensor or a day/night sensor can be used as the detection unit 421. As another embodiment, a device capable of daytime/nighttime determination may be used as the detection unit 421. For example, a time measurement device that measures the time, a communication device that obtains time information, or the like may be used.

Note that for the sake of descriptive convenience, the detection unit 421 is assumed here to be a unit that detects whether the self-vehicle is in a daytime environment or a nighttime environment. However, as another embodiment, the detection unit 421 may also be further capable of detecting whether the self-vehicle is traveling through a tunnel.

The driving unit 422 drives the light sources 41a to 41d in sequence. The driving unit 422 first drives the light source 41a, drives the light source 41b next, then drives the light source 41c, and finally drives the light source 41d. As result, all of the light sources 41a to 41d are set in an ON state, and all of the light sources 41a to 41d will subsequently be set in an OFF state at once. This series of operations will be repeated cyclically. In this point of view, a state in which the light sources 41a and the like are driven indicates a state in which the light sources 41a and the like are turned on or a state in which the light sources 41a and the like are set in the ON state. On the other hand, a state in which driving is suppressed indicates a state in which the light sources 41a and the like are turned off or a state in which the light sources 41a and the like are set in the OFF state. Although the details will be described later, the driving unit 422 can change the driving mode of the light sources 41a to 41d based on a detection value obtained by the detection unit 421.

By using the above-described arrangement, each of the turn signals 122R and 122L will cyclically repeat a series of operations, in which the light sources 41a to 41d are sequentially set in the ON state from those arranged in the inner side to the outer side in the vehicle width direction and subsequently setting all of the light sources 41a to 41d to the OFF state at once, so that this display of intention will be visually recognized by a third party. Such turn signals 122R and 122L can also be referred to as sequential blinkers or the like.

(Driving Modes of Lighting Device)

Figure 5A:
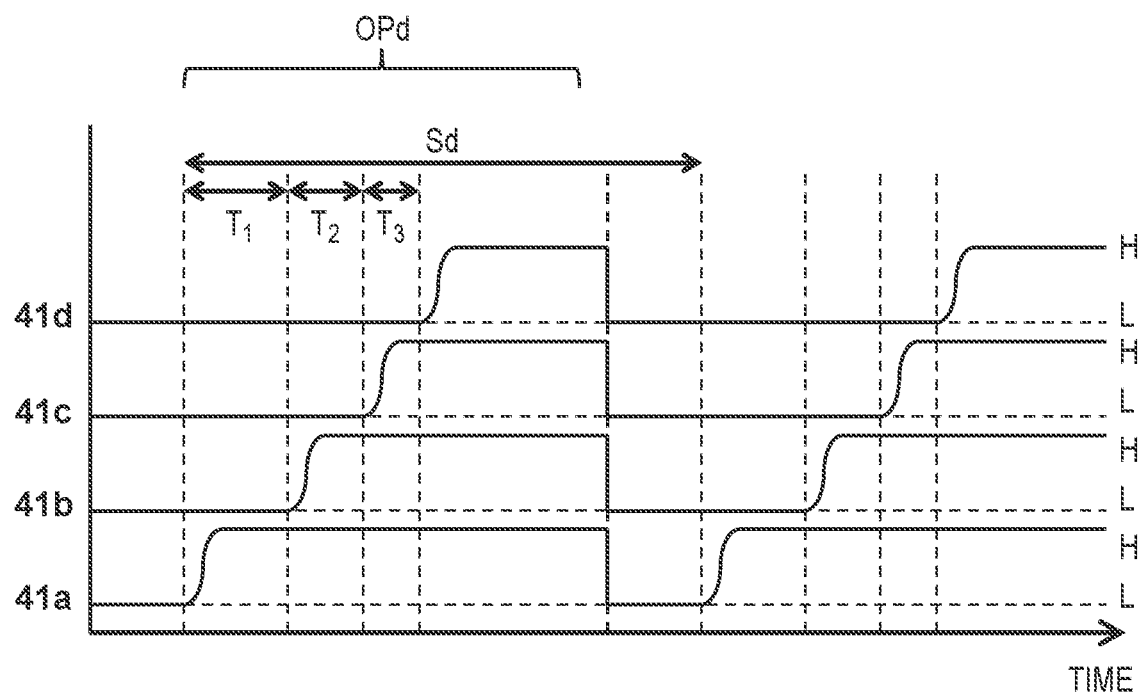
FIGS. 5A and 5B are timing charts each showing a driving mode of a lighting device.
Figure 5B:
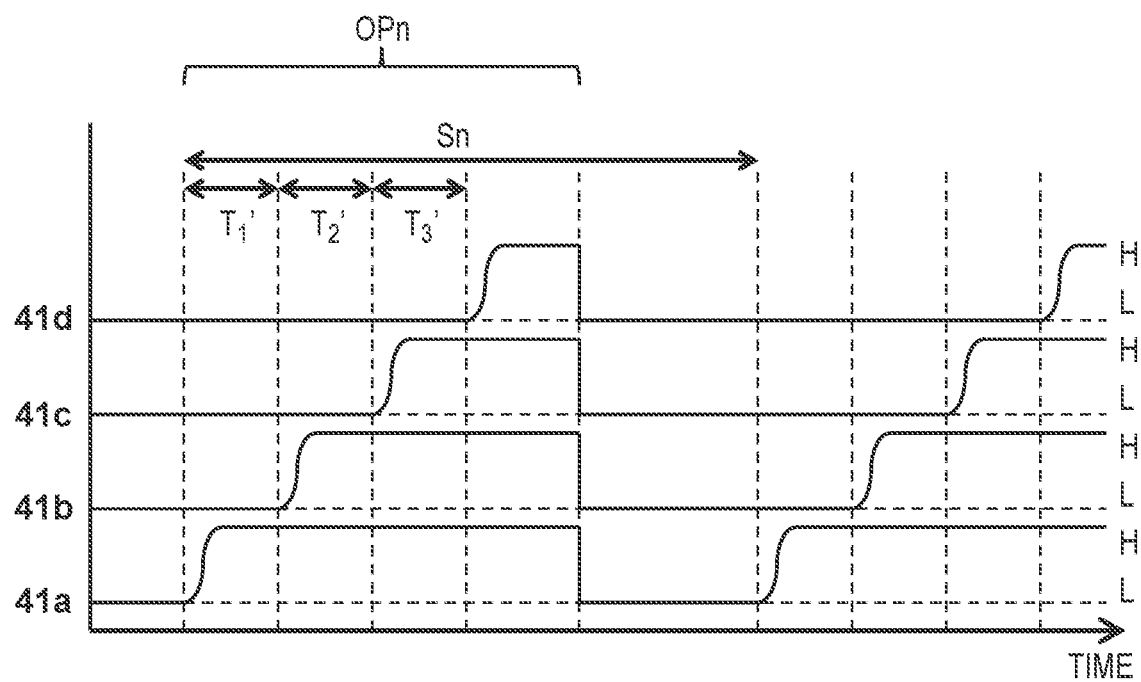

FIG. 5A is a timing chart showing the driving mode of the light sources 41a to 41d in a daytime environment. FIG. 5B is a timing chart showing the driving mode of the light sources 41a to 41d in a nighttime environment. In each chart, the abscissa indicates a time axis, and the ordinate indicates the signal value of a driving signal for driving each of the light sources 41a to 41d.

In regards to the signal value of the driving signal, H level (high level) indicates a state in which a corresponding one of the light sources 41a to 41d is being driven, and L level (low level) indicates a state in which driving is suppressed. Assume that the driving signals are generated like pulses in this manner, and the pulse widths between the driving signals are different from each other. Note that a light amount of each light source 41a or the like corresponds to the signal value of the driving signal, and a state in which the light source 41a or the like is driven corresponds to the timing at which the signal value starts to increase from L level.

Daytime/nighttime determination is performed based on whether a detection value (to be referred to as a "detection value V1" hereinafter) obtained by the detection unit 421 is larger or smaller than a predetermined reference value (to be referred to as a "reference value $V_{REF}$" hereinafter). That is, $V1>V_{REF}$ indicates a daytime environment, and $V1<V_{REF}$ indicates a nighttime environment. The driving unit 422 can change the driving mode of the light sources 41a to 41d based on whether the self-vehicle is in a daytime environment ($V1>V_{REF}$) or in a nighttime environment ($V1<V_{REF}$). Note that $V1=V_{REF}$ can correspond to either a daytime environment or a nighttime environment.

First, a series of operations performed by the light sources 41a to 41d in a case in which the detection value V1 is larger than the reference value $V_{REF}$ (a case in which the self-vehicle is in a daytime environment (see FIG. 5A)) is referred to as an "operation OPd". In the daytime operation OPd, assume that $T_1$ is a period from when the light source 41a is driven to when the light source 41b is driven. In a similar manner, assume that $T_2$ is a period from when the light source 41b is driven to when the light source 41c is driven, and $T_3$ is a period from when the light source 41c is driven to when the light source 41d is driven.

At this time, as is obvious from FIG. 5A, the driving unit 422 drives the light sources 41a to 41d so that $$T_1>T_2>T_3$$

will be established. That is, during in a daytime environment, the driving timing delay time of each of the light sources 41a to 41d to be sequentially driven will change (will decrease).

On the other hand, a series of operations performed by the light sources 41a to 41d in a case in which the detection value V1 is smaller than the reference value $V_{REF}$ (a case in which the self-vehicle is in a nighttime environment (see FIG. 5B)) is referred to as an "operation OPn". In the nighttime operation OPn, assume that $T_1'$ is a period from when the light source 41a is driven to when the light source 41b is driven. In a similar manner, assume that $T_2'$ is a period from when the light source 41b is driven to when the light source 41c is driven, and $T_3'$ is a period from when the light source 41c is driven to when the light source 41d is driven.

As is obvious from FIGS. 5A and 5B, when the daytime driving operation and the nighttime driving operation are compared, the driving unit 422 drives the light sources 41a to 41d so that $$T_1'-T_2'<T_1-T_2 \text{ and}$$

$$T_2'-T_3'<T_2-T_3$$

will be established. That is, in the driving operation in a nighttime environment, changes in the above-described driving timing delay times are suppressed compared to the driving operation in a daytime environment.

In this embodiment, assume that the driving unit 422 will drive the light sources 41a to 41d so that $$T_1'-T_2'=0 \text{ and}$$

$$T_2'-T_3'=0$$

will be established. That is, in the driving operation in a nighttime environment, the driving timing delay times of the respective light sources 41a to 41d to be sequentially driven will not change.

In sum, the driving unit 422 will cyclically repeat a series of operations OPd or OPn in which the light sources 41a to 41d in the OFF state are sequentially set to the ON state and all of the light sources 41a to 41d, which have been set in the ON state, are subsequently set to the OFF state at once. In the daytime operation OPd, the light sources 41a to 41d are driven so that the delay times of the respective ON timings will decrease sequentially. On the other hand, in the nighttime operation OPn, the light sources 41a to 41d are driven so that the changes in the delay times of the respective ON timings will be suppressed compared the daytime operation (so the delay times will not change in this embodiment).

In addition, assume that a cycle Sd is a cycle of the daytime operation OPd and a cycle Sn is a cycle of the nighttime operation OPn. At this time, as is obvious from FIGS. 5A and 5B, the driving unit 422 will perform the operations OPd and OPn so that $$Sd<Sn$$

will be established.

In addition, in this embodiment, the driving unit 422 will drive each of the light sources 41a to 41d so that the amount of chronological change of the light amount will first increase and then decrease. More specifically, as shown in FIGS. 5A and 5B, the driving signal of each of the light sources 41a to 41d gradually increases at least in a rising edge (a waveform in which the signal transitions from L level to H level). In this embodiment, the signal value will reach H level by first increasing so that its second-order differential value will be positive (so that the first-order differential value will gradually increase) and subsequently increasing so that its second-order differential value will be negative (so that the first-order differential value will gradually decrease). As a result, it will be possible to give a comparatively soft impression to a third party who visually recognizes the blinking (the repetitive turning on and off) of the individual light sources 41a to 41d.

On the other hand, the falling edge (a waveform in which the signal transitions from H level to L level) of the driving signal of each of the light sources 41a to 41d can change in a rectangular shape. The driving signals of all of the light sources 41a to 41d can also shift to L level at once.

In general, a person can visually recognize a target object by adjusting his/her pupils in accordance with the environment. That is, during daytime, a target object is visually confirmed in a state in which the pupils are comparatively closed, and during nighttime, a target object is visually confirmed in a state in which the pupils are comparatively open. Based on a diligent consideration by the present inventor, it has been found that changing the light emission mode of the light sources 41a to 41d in accordance with whether the self-vehicle is in a daytime environment or a nighttime environment will change how easily the light sources can be visually recognized by a third party such as a pedestrian or the like. According to the above-described driving method, it will be possible to make a third party appropriately visually recognize the light emission (that is, the rider's intention) of the lighting device by a mode corresponding to the environment.

In the above-described embodiment, the number of the light sources 41a and the like is 4. However, the number of the light sources 41a and the like suffices to be 3 or more. For example, letting N be an integer of 3 or more, the contents of the embodiment can be applied to an arrangement in which a first light source to an Nth light source are sequentially arranged, and can be summarized as follows by letting K be an integer of 1 to (N−1). That is, assume that $T_K$ is a period from when a Kth light source is driven to when a (K+1)th light source is driven in a case in which the detection value V1 is larger than the reference value $V_{REF}$ (the case of a daytime environment (see FIG. 5A)). In addition, assume that $T_K'$ is a period from when the Kth light source is driven to when the (K+1)th light source is driven in a case in which the detection value V1 is smaller than the reference value $V_{REF}$ (the case of a nighttime environment (see FIG. 5B)).

At this time, the driving unit 422 can drive the first light source to the Nth light source so that $$T_K>T_{K+1} \text{ and}$$

$$T_K'-T_{K+1}'<T_K-T_{K+1}$$

will be established.

In addition, the daytime and nighttime driving modes of the light sources 41a to 41d are not limited to those exemplified in the embodiment, and can be modified into various modes and be changed without departing from the spirit and scope of the present invention. For example, the above-described driving modes can be set to have not only two patterns corresponding to daytime and nighttime, but also three or more patterns corresponding to early morning, daytime, evening, nighttime, late night, and the like by using a plurality of reference values $V_{REF}$ to be the comparison targets of the detection value V1. Hence, the driving unit 422 can drive the plurality of the light sources 41a and the like so that the driving timings of the plurality of the light sources 41a and the like will change in accordance with each detection value obtained by the detection unit 421.

In regards to the case of a daytime environment (the case of V1>$V_{REF}$ (see FIG. 5A)) and the case of a nighttime environment (the case of V1<$V_{REF}$ (see FIG. 5B)), the contents of the embodiment can be summarized as follows. That is, in a daytime environment, the driving unit 422 will sequentially drive the plurality of light sources 41a and the like so that the time from the driving timing of a given light source to the driving timing of a subsequent light source will decrease in sequence. On the other hand, in a nighttime environment, the driving unit 422 will sequentially drive the plurality of light sources 41a and the like so the time from the driving timing of a given light source to the driving timing of a subsequent light source will not decrease in sequence compared to the case of the daytime environment.

Suitable values can be applied to the periods $T_1$ and the like in the examples of FIGS. 5A and 5B. For example, $T_1$=70 [msec]

$T_2$=45 [msec]

$T_3$=20 [msec]

$T_1'$=60 [msec]

$T_2'$=60 [msec]

$T_3'$=60 [msec]

can be employed.

Although the pair of left and right turn signals 122 of the front lighting device 12 were described above, this arrangement may also be applied to other lighting devices (for example, the turn signals 132, the headlight 121, the tail light 131, and the like).

In the above description, to facilitate understanding, each element is indicated by a name associated with its function. However, each element is not limited to an element having the contents described in the embodiment as the main function, and may include an element having the contents described in each embodiment as an auxiliary function. For example, although the vehicle 1 has been shown as a typical example in this specification, the contents of the embodiment can also be applied to vehicles (such as ships and the like) which do not include wheels, that is, the contents of the embodiment are applicable to various kinds of moving bodies.

Summary of Embodiment

The contents of the embodiment can be summarized as follows:

The first aspect is related to a driving device (for example, 42), and the driving device is a driving device for driving an in-vehicle lighting device (for example, 12, 121, 122, 13, 131, 132) in which a plurality of light sources (for example, 41a and the like) are arranged in one direction, characterized by comprising: a detection unit (for example, 421) configured to detect an environment of a vehicle; and a driving unit (for example, 422) configured to drive the plurality of light sources in sequence in the one direction, wherein in a first case in which a detection value (for example, VI) obtained by the detection unit is larger than a reference value (for example, $V_{REF}$), the driving unit will drive the plurality of light sources in sequence so that a time from a driving timing of a given light source to a driving timing of a subsequent light source will decrease in sequence, and in a second case in which the detection value is smaller than the reference value, the driving unit will drive the plurality of light sources in sequence so the time for the driving timing of the given light source to the driving timing of the subsequent light source will not decrease in sequence compared to the first case. In general, a person can visually recognize a target object by adjusting his/her pupils in accordance with the environment. According to the first aspect, the light emission mode of the plurality of light sources can be changed in accordance with the environment of the vehicle. As a result, it will be possible to make a third party (for example, a pedestrian) appropriately visually recognize the light emission (that is, the driver's intention) of the lighting device by a mode corresponding to the environment.

In the second aspect, the device is characterized in that letting N be an integer of not less than 3 and the plurality of light sources include a first light source to an Nth light source, and letting K be an integer of 1 to (N−1), $T_K$ be a period from when a Kth light source is driven to when a (K+1)th light source is driven when the detection value obtained by the detection unit is larger than the reference value, and $T_K'$ be a period from when the Kth light source is driven to when the (K+1)th light source is driven when the detection value is smaller than the reference value, the driving unit will drive the first light source to the Nth light source so that $T_K > T_{K+1}$ and $T_K' - T_{K+1}' < T_K - T_{K+1}$ will be established. As a result, it will be possible to implement the first embodiment comparatively easily.

In the third aspect, the device is characterized in that the driving unit will drive the first light source to the Nth light source so that $T_K - T_{K+1}' = 0$ will be established. As a result, it will be possible to provide a more aesthetic appearance to a third party who will visually recognize the first light source to the Nth light source.

In the fourth aspect, the device is characterized in that the driving unit will cyclically perform a series of operations (for example, OPd, OPn) to drive the first light source to the Nth light source in sequence, and letting Sd be a cycle of the series of operations (for example, OPd) when the detection value is larger than the reference value and Sn be a cycle of the series of operations (for example, OPn) when the detection value is smaller than the reference value, the driving unit will perform the series of operations so that $Sd < Sn$ will be established. The mode in which the first light source to the Nth light source are blinked (repetitively turned on and off) can be changed in accordance with the environment of the vehicle.

In the fifth aspect, the device is characterized in that the driving unit drives each of the first light source to the Nth light source so that an amount of chronological change of a light amount will first increase and then decrease (see FIG. 5A). As a result, blinking of the first light source to the Nth light source can be performed so as to give a comparatively soft impression to a third party.

In the sixth aspect, the device is characterized in that the detection unit detects brightness of an external environment of the vehicle. As a result, the light emission mode of the first light source to the Nth light source can be changed in accordance with a daytime environment and a nighttime environment.

The seventh aspect is related to a lighting device (for example, 12, 121, 122, 13, 131, 132), and the lighting device is characterized by comprising:

a driving device (for example, 42) described above; and
a first light source to an Nth light source.

That is, the above-described driving device is applicable to a known lighting device.

In the eight aspect, the device is characterized in that the first light source to the Nth light source are arranged in sequence from an inner side to an outer side in a vehicle width direction. As a result, the light emission of the lighting device can be visually confirmed by a third party more appropriately.

The ninth aspect is related to a vehicle (for example, 1) and the vehicle is characterized by comprising:
a lighting device described above; and
a wheel (for example, 14). That is, the above-described lighting device is applicable to a known vehicle.

Another aspect is related to a driving device (for example, 42), and the driving device is a driving device for driving an in-vehicle lighting device (for example, 12, 121, 122, 13, 131, 132) in which a first light source to an Nth light source (for example, 41a-41d), where N is an integer not less than 3, are arranged in sequence, characterized by comprising: a detection unit (for example, 421) configured to detect an environment of a vehicle; and a driving unit (for example, 422) configured to drive the first light source to the Nth light source in sequence, wherein letting K be an integer of 1 to (N−1), $T_K$ be a period from when a Kth light source is driven to when a (K+1)th light source is driven when the detection value obtained by the detection unit is larger than the reference value, and $T_K'$ be a period from when the Kth light source is driven to when the (K+1)th light source is driven when the detection value is smaller than the reference value, the driving unit will drive the first light source to the Nth light source so that $$T_K > T_{K+1} \text{ and}$$

$$T_K' - T_{K+1}' < T_K - T_{K+1}$$

will be established. An effect similar to the first aspect can also be implemented by this aspect.

Still another aspect is related to a driving device (for example, 42), and the driving device is a driving device for driving an in-vehicle lighting device (for example, 12, 121, 122, 13, 131, 132) in which a plurality of light sources (for example, 41a-41d) are arranged in one direction, characterized by comprising: a detection unit (for example, 421) configured to detect an environment of a vehicle; and a driving unit (for example, 422) configured to drive the plurality of light sources in sequence in the one direction, wherein the driving unit drives the plurality of light sources so that driving timings of the plurality of light sources will change in accordance with a detection value obtained by the detection unit. That is, various changes can be made to the embodiment without departing from the spirit and scope of the present invention.

The invention is not limited to the foregoing embodiments, and various variations/changes are possible within the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A driving device for driving an in-vehicle lighting device in which a plurality of light sources are arranged in one direction, comprising:

a detection unit configured to detect an environment of a vehicle; and
a driving unit configured to drive the plurality of light sources in sequence in the one direction,
wherein in a first case in which a detection value obtained by the detection unit is larger than a reference value, the driving unit will drive the plurality of light sources in sequence so that a time from a driving timing of a given light source to a driving timing of a subsequent light source will decrease in sequence, and
in a second case in which the detection value is smaller than the reference value, the driving unit will drive the plurality of light sources in sequence so the time for the driving timing of the given light source to the driving timing of the subsequent light source will not decrease in sequence compared to the first case.

2. The device according to claim 1, wherein letting N be an integer of not less than 3 and the plurality of light sources include a first light source to an Nth light source, and letting K be an integer of 1 to (N−1), $T_K$ be a period from when a Kth light source is driven to when a (K+1)th light source is driven when the detection value obtained by the detection unit is larger than the reference value, and $T_K'$ be a period from when the Kth light source is driven to when the (K+1)th light source is driven when the detection value is smaller than the reference value, the driving unit will drive the first light source to the Nth light source so that $$T_K > T_{K+1} \text{ and}$$

$$T_K' - T_{K+1}' < T_K - T_{K+1}$$

will be established.

3. The device according to claim 2, wherein the driving unit will drive the first light source to the Nth light source so that $$T_K' - T_{K+1}' = 0$$

will be established.

4. The device according to claim 2, wherein the driving unit will cyclically perform a series of operations to drive the first light source to the Nth light source in sequence, and letting Sd be a cycle of the series of operations when the detection value is larger than the reference value and Sn be a cycle of the series of operations when the detection value is smaller than the reference value, the driving unit will perform the series of operations so that $$Sd < Sn$$

will be established.

5. The device according to claim 2, wherein the driving unit drives each of the first light source to the Nth light source so that an amount of chronological change of a light amount will first increase and then decrease.

6. The device according to claim 2, wherein the detection unit detects brightness of an external environment of the vehicle.

7. A lighting device comprising:
a driving device defined in claim 2; and
a first light source to an Nth light source.

8. The device according to claim 7, wherein the first light source to the Nth light source are arranged in sequence from an inner side to an outer side in a vehicle width direction.

9. A vehicle comprising:
a lighting device defined in claim 7; and
a wheel.

* * * * *